No. 680,308. Patented Aug. 13, 1901.
J. E. ATKINS.
MOP.
(Application filed Nov. 27, 1900.)
(No Model.)

WITNESSES.

INVENTOR
John E. Atkins
BY
ATTORNEYS

UNITED STATES PATENT OFFICE.

JOHN ELIJAH ATKINS, OF MERIDEN, CONNECTICUT.

MOP.

SPECIFICATION forming part of Letters Patent No. 680,308, dated August 13, 1901.

Application filed November 27, 1900. Serial No. 37,877. (No model.)

*To all whom it may concern:*

Be it known that I, JOHN ELIJAH ATKINS, a citizen of the United States, and a resident of Meriden, in the county of New Haven and State of Connecticut, have invented a new and Improved Mop, of which the following is a full, clear, and exact description.

This invention relates to improvements in mops for cleaning water-closets, urinals, chamber vessels, and the like; and the object is to provide a mop of simple construction and containing soap that may be used to effectively clean the devices and obviating the placing of a person's hands in the water.

I will describe a mop embodying my invention and then point out the novel features in the appended claims.

Reference is to be had to the accompanying drawings, forming a part of this specification, in which similar characters of reference indicate corresponding parts in both the figures.

Figure 1:
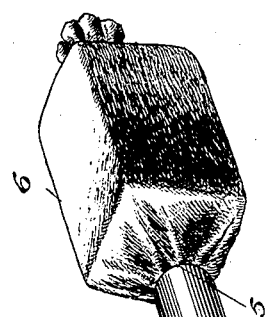
Figure 2:
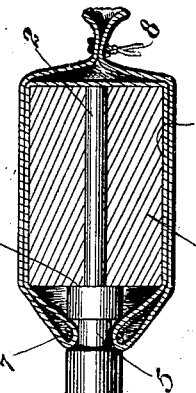

Figure 1 is a perspective view of a mop embodying my invention, and Fig. 2 is a sectional view thereof.

The mop comprises a handle 1 of any desired length and shape and consisting of any suitable material. One end of the handle is reduced in diameter, as at 2, and is designed to be passed through a perforation made in a cake of soap 3, the inner end of said cake of soap resting against a shoulder 4, formed at the base of the reduced portion. Formed in the handle near the shoulder 4 is an annular channel 5. When the cake of soap is placed on the reduced portion 2 of the handle, it is covered and held in place by cohesion and by means of a covering material 6, which is closed at one end and open at the other, similar to a bag. This cover may consist of any suitable fabric through which water and dissolved soap may freely pass. I find a knit material has the proper qualities for a cover.

After placing the cake of soap on the handle the cover is to be drawn over the same, so that the closed end thereof will engage the outer end of the cake of soap. Then the middle is to be drawn inward and fastened within the channel 5 by means of a cord 7, which for convenience may be fastened to the cover. After tying the cover at this point its open end is to be drawn outward over the inner layer of the cover and the ends are to be tied together at the free end of the cake of soap by means of a string 8 or the like, which will be fastened to the cover, thus making a double cover.

In use a person having hold of the handle 1 will agitate the mop in the water contained in the water-closet or other vessel, and then the mop is to be moved around the walls to thoroughly clean them. As the handle is quite long it will be unnecessary for a person to put his or her hands into the water.

While I have shown the cake of soap as angular, it is obvious that it may be otherwise shaped without departing from the spirit of my invention. It will be found more convenient, however, to use the ordinary bar soap, which is usually angular in cross-section. When the cake of soap is used up, a new cake may readily be placed in position.

Having thus described my invention, I claim as new and desire to secure by Letters Patent—

1. A mop comprising a handle having an annular channel formed in it and adapted to have an end inserted into a cake of soap, and a bag-like cover drawn over the cake of soap and secured in said annular channel, substantially as specified.

2. A mop, comprising a handle having a reduced portion designed to be inserted into a cake of soap and having a channel near the junction of said reduced portion with the larger portion, a covering closed at one end and open at the other end, the covering being first drawn over the cake of soap and secured at about its middle portion in said channel, a cord for so securing the cover, the cover having a portion passing over the portion engaging with the cake of soap, and means for fastening the open end of the cover at the outer end of the cake of soap, substantially as specified.

In testimony whereof I have signed my name to this specification in the presence of two subscribing witnesses.

JOHN ELIJAH ATKINS.

Witnesses:
JOHN Q. THAYER,
H. BURROUGHS BEACH.